Jan. 16, 1962  F. STYNER ETAL  3,017,079
VISUAL INDICATING DEVICE FOR CASH REGISTERS
Filed Dec. 28, 1954  5 Sheets-Sheet 1

INVENTORS
Fritz Styner and Adolf Chlouba
BY
Edward V. Connors
ATTORNEY

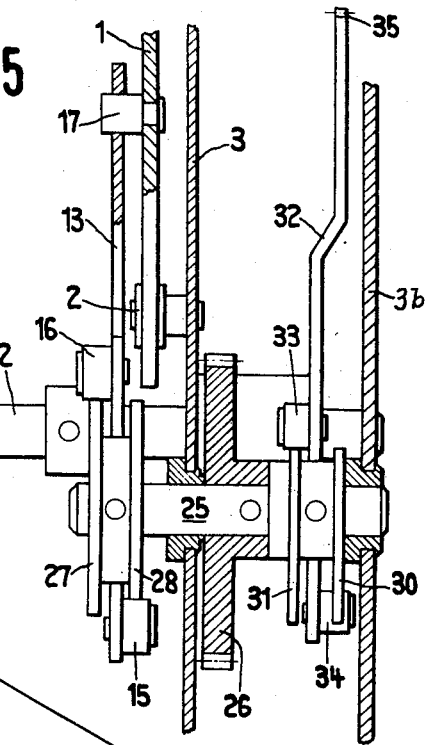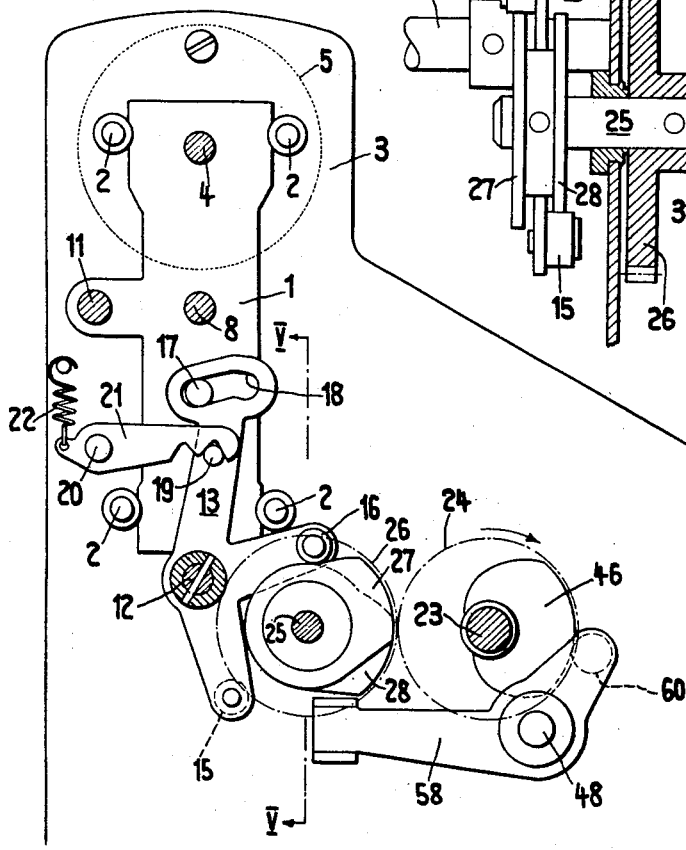

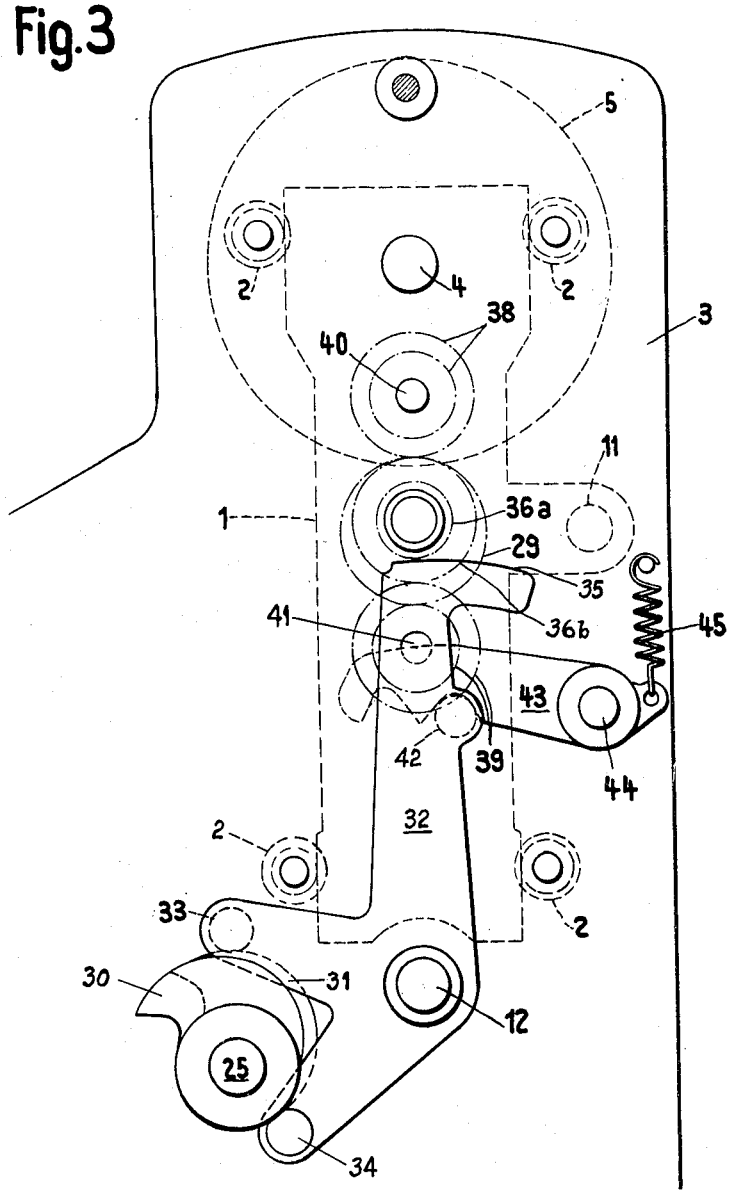

Jan. 16, 1962 F. STYNER ETAL 3,017,079
VISUAL INDICATING DEVICE FOR CASH REGISTERS
Filed Dec. 28, 1954 5 Sheets-Sheet 4

Fig.4

INVENTORS
Fritz Styner and Adolf Chlouba
BY Edward J. Connors
ATTORNEY

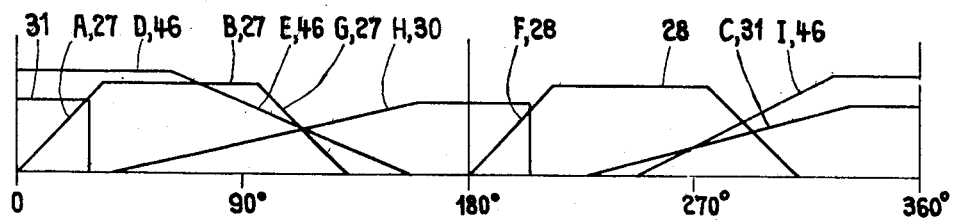
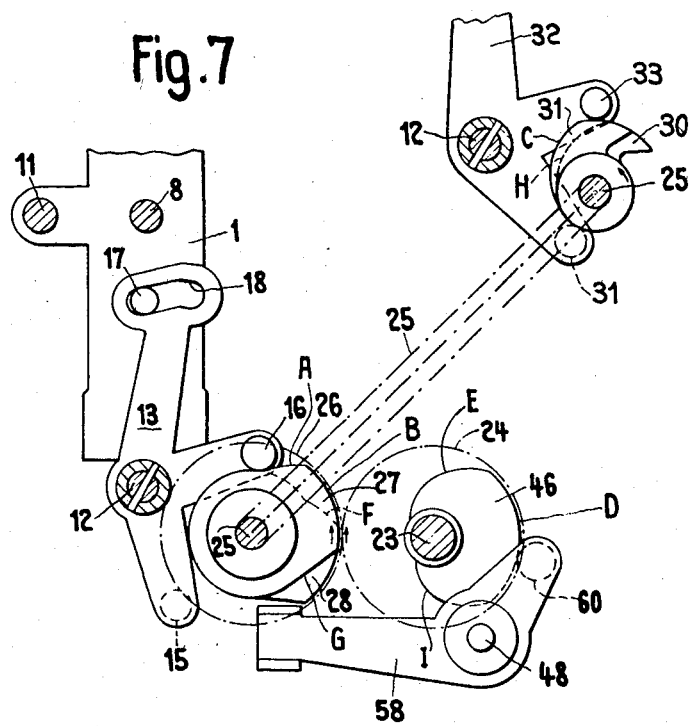

3,017,079
VISUAL INDICATING DEVICE FOR CASH REGISTERS

Fritz Styner, Riedern, and Adolf Chlouba, Brunnenstrasse 55, Bern-Bumpliz, Switzerland; Gustav Adolf Erni executor of said Adolf Chlouba, deceased
Filed Dec. 28, 1954, Ser. No. 478,148
Claims priority, application Switzerland Jan. 20, 1954
3 Claims. (Cl. 235—23)

This invention relates to a visual indicating device for cash registers. Cash registers are usually equipped with a visual indicating device allowing continuous and immediate control of all the registering and calculating operations effected. The indicating means of known visual indicating devices for cash registers are constituted by cipher rolls or cipher boards or strips.

The visual indicating device according to this invention, having indicating means, adjusting means, cancel means and a driving shaft, the said adjusting means and the said cancel means being operably engageable with the said indicating means, is broadly characterized in that the said indicating means are disengaged from the said adjusting means for a given period of each indicating cycle for being brought into a zero position by the said cancel means which latter are positively controlled by the driving shaft. Due to this positive control of the cancel means the indicating means are forcibly returned to the zero position without spring action.

One embodiment of the visual indicating device of a cash register is illustrated, by way of example, in the accompanying drawings of which:

FIG. 2 shows the mechanism for lifting and lowering the indicating means in order to disengage and engage them with their adjusting means, as seen from the left in FIG. 5.

FIG. 3 shows the control parts of the mechanism for returning the indicating means into their zero position, as seen from the right in FIG. 5.

FIG. 4 is a partial cross section of the visual indicating device on the line IV—IV in FIG. 1, cam controlled levers and rollers being partially shown in side view, and FIG. 5 is a section on the line V—V in FIG. 2, whereby the control cams and the control rollers are not shown in section.

FIG. 6 is a timing diagram.

FIG. 7 is a complete illustration of the control cams and the members cooperating therewith.

Figure 1:
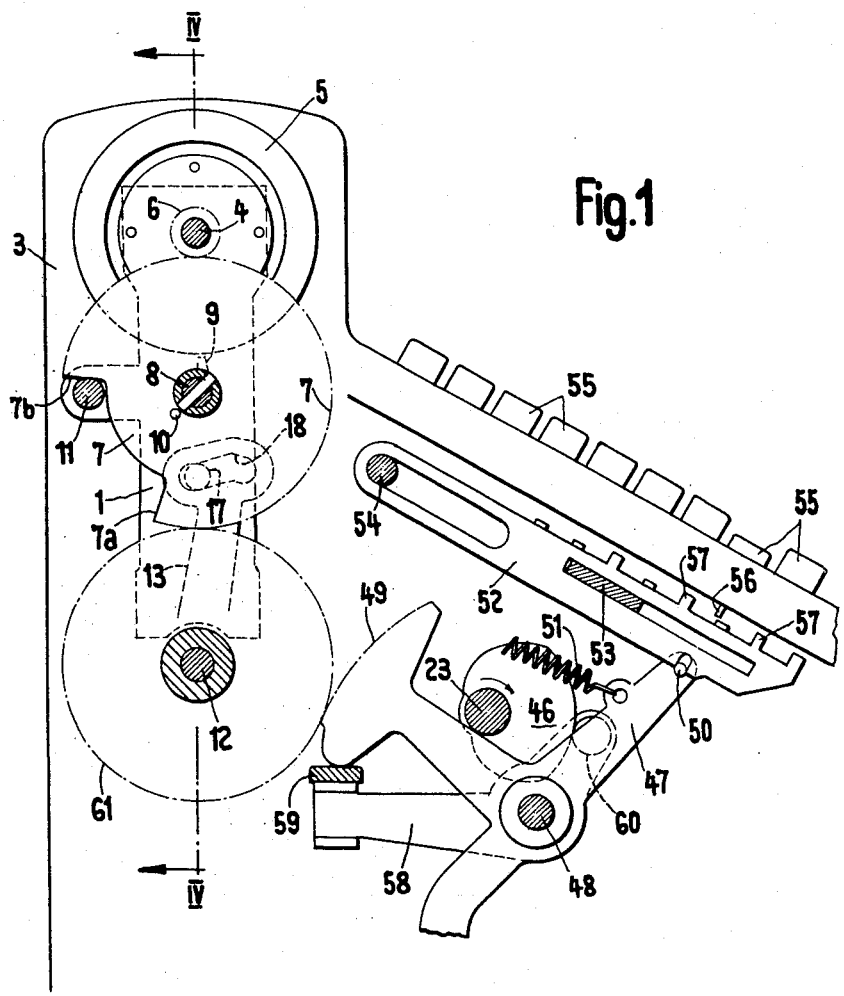
FIG. 1 illustrates the arrangement of the visual indicating device of a cash register in section on the line I—I in FIG. 4.

The indicating device has two supports 1 and 1a which may vertically be displaced between the machine walls 3 and 3a on guiding rollers 2 (FIGS. 2, 3 and 4). Shafts 4 and 8 are mounted in these movable supports. The indicating members of the device, constituted by cipher rolls 5, are mounted for free rotation on the shaft 4 (FIG. 4). Each of the cipher rolls 5 is rigidly connected with a toothed wheel 6. Each of the toothed wheels 6 gears with one of several similar toothed wheels 7 mounted for free rotation on shaft 8. Each of the toothed wheels 7 has a recess forming stops 7a and 7b. Cancelling cams 9 are fixed on shaft 8 and cooperate in a manner described below with pins 10 fixed in the toothed wheels 7 in order to return the cipher rolls 5 into their zero position. A shaft 11 (FIGS. 1, 2) is mounted in the supports 1 and 1a, serving as a stop for the toothed wheels 7.

A shaft 12 is rotatably mounted in the walls 3 and 3a and two similar cam levers 13 and 14 are fixed on the shaft 12. Two rollers 15 and 16 are provided on the cam lever 13. A control roller 17 projecting into the cam slots 18 of the cam levers 13 and 14 is fixed on each of the supports 1 and 1a. The cam lever 13 has also a roller 19 cooperating with a stop lever 21 rotatably mounted on the wall 3 by means of a pin 20. The stop lever 21 is pressed against the roller 19 by a spring 22 and determines the end positions of the cam levers 13 and 14.

A toothed wheel 24 is fixed on a main driving shaft 23 of the cash register, which shaft 23 is turned by a full rotation in the direction of the arrows (FIGS. 1 and 2) for every indicating cycle of the device. The toothed wheel 24 gears with a toothed wheel 26 fixed on a shaft 25. On the shaft 25 are fixed cam discs 27, 28, 30 and 31 which are driven from the main driving shaft 23 over gears 24 and 26.

The cam lever 13 is arranged between the cam discs 27 and 28 (FIGS. 2 and 5) in such a way that the cam disc 27 cooperates with the roller 16 and the cam disc 28 cooperates with the roller 15 for controlling the cam levers 13 and 14.

A toothed wheel 29 is fixed on the shaft 8. A lever 32 having two control rollers 33 and 34 is so disposed between cam discs 30 and 31 fixed on the shaft 25, that the cam disc 30 cooperates with the roller 34 and the cam disc 31 cooperates with the roller 33 for control of the lever 32. A toothed wheel 36 is mounted on the wall 3b by means of a pin 37 and has two toothings 36a and 36b, the toothing 36a gearing with a toothing 35 on the lever 32, and the toothing 36b gearing with toothed wheels 38 and 39 rotatably mounted on the machine wall 3 by means of pins 40 and 41 respectively (FIGS. 3 and 4). The lever 32 has a stop roller 42 cooperating with a stop lever 43 mounted on a pin 44 and loaded by a spring 45 for determining the end positions of the lever 32.

A cam disc 46 is fixed on the main shaft 23 of the machine which may be turned in the direction indicated by the arrows in FIGS. 1 and 2 by a crank handle or by a motor (not shown). Adjusting levers 47 are mounted for free rotation on a shaft 48. Each of the adjusting levers 47 has a toothed sector 49. The number of adjusting levers 47 corresponds to the number of cipher rolls 5 provided. The toothed sectors 49 gear each with one of a number of similar toothed adjusting wheels 61. Each of the adjusting levers 47 has a pin 50 engaging an adjusting slide 52 guided on a guiding bar 53 and a rod 54. Each of the registering keys 55 of the cash register is connected to a key bar 56 adapted for cooperation with different stops 57 of the adjusting slides 52. A returning bow 58 having a returning bar 59 is fixed on the shaft 48. The returning bow 58 is controlled by a control roller 60 engaging the cam disc 46. The toothed adjusting wheels 61 are mounted for free rotation on the shaft 12 and continuously gear with the toothed sectors 49 but only at times with the toothed wheels 7.

Control cams 27, 28, 30, 31 and 46 are shown in their initial or rest position throughout the drawing.

The visual indicating device illustrated and described operates as follows:

At the beginning of the indicating and registering cycle at least one of the registering keys 55 (for instance the key corresponding to the cipher "2" of the digit of which the mechanism is shown in FIG. 1) is pressed down and latched in depressed position, whereupon the main shaft 23 of the machine is turned in a manner well known in the art by one full revolution in the direction of the arrows, driving thereby the cam disc 46 and, over gearing 24, 26, the cam discs 27, 28, 30 and 31. The timing diagram for the said full revolution of the main shaft is shown in FIG. 6, wherein portions of the timing diagram are designated with the same reference numbers and reference letters as the cams and cam portions respectively in FIG. 7. By this rotation the cam disc 27 engages the control roller 16 of the cam lever 13 which is turned out of the position shown in FIGS. 1, 2 and 7. Thereby the cam lever 14 executes the same movement. By this movement of the cam levers 13 and 14 the supports 1 and 1a are lifted by the rollers 17 engaging the cam slots 18 of the levers 13 and 14, whereby corresponding toothed wheels 7 and 61 are disengaged, that is, the indicating members or means 5 are disengaged from their corresponding adjusting members or means 61. The toothed wheel 29 mounted on the shaft 8 is also lifted and is disengaged from the toothed wheel 39 and is engaged with the toothed wheel 38.

As shown in FIG. 3 of the drawing, cam 31 engages the roller 33 of the cancelling lever 32 when the machine is in its rest position thereby maintaining the cancelling lever 32 in its right-hand end position as shown in FIG. 3. The rotation of cams 30 and 31 is clockwise as seen in FIG. 3 and cam 31 is so designed that it has left the roller 33 when the rotation of the machine shaft has completed the disengagement of wheels 7 and 61 respectively as set our above. On further rotation of the main machine shaft 23 and of the shaft 25, cam disc 30 engages the control roller 34 of the cancelling lever 32 and turns the latter in anticlockwise direction from its rest position shown in FIG. 3 to a left-hand end position determined by engagement of its stop roller 42 in the left notch of stop lever 43. Since the toothed wheel 36 gears with the toothing 35 of the lever 32, the wheel 36 and the wheels 38 and 39 gearing with the same, are turned by the lever 32. By the toothed wheel 29 gearing with the toothed wheel 38, the cancelling shaft 8 is rotated anticlockwise as seen in FIG. 1 together with its cancelling cams 9, which latter will engage the pins 10 of the toothed wheels 7, which are turned anticlockwise (FIG. 1) through such an angle that the stops 7b abut against the rod 11 as shown in FIG. 1. Thereby the cipher rolls 5 are returned into their zero position by the toothed wheels 6 (FIG. 1). During this cancelling movement, that is, during the disengaged position of the wheels 61 and 7, the control roller 60 of the returning bow 58 follows the curve of the cam disc 46 and the returning bar 59 releases the adjusting levers 47 which will be turned under the pull of springs 51 until the corresponding adjusting slides 52, coupled with them and which have been released by a well known mechanism (not shown) on pressing down one of the registering keys 55, will abut against the key bar of the depressed registering key 55 (for example the key bar of the key "2" in the drawing). By this movement the sector 49 of the adjusting lever 47 shown in the drawing advances the adjusting wheel 61 clockwise for example, two teeth.

At the end of the first half revolution of the main shaft 23 of the machine the cam disc 28 engages the roller 15 of the cam lever 13 and turns this lever back into the position shown in FIG. 1, whereby the supports 1 and 1a are lowered and the adjusting wheels 7 are again engaged with the wheels 61. Thereby the wheel 29 leaves the wheel 38 and engages the wheel 39. Somewhat later the cam disc 31 again engages the roller 33 of the cancelling lever 32 and returns the latter clockwise (FIG. 3) into its initial position, whereby its toothing 35 turns the wheels 36, 38, 39 and 29 in inverse direction thereby returning the cancelling shaft and the cancelling cams 9 to their initial position shown in FIG. 1. At the same time the returning bar 59 of the returning bow 58 which is controlled by the roller 60 from the cam disc 46 returns the adjusting levers 47 back into their rest position, whereby the corresponding toothed adjusting wheels 61 are returned to their initial position by the toothed sectors of the adjusting levers 47. The wheels 6 and 7 which are in engagement with the adjusting wheels 61 will be displaced by such an angle that the cipher registered for the corresponding digit, for instance the cipher "2" of the indicating cipher roll or any other registered cipher will appear at the end of the indicating cycle. At the end of a full revolution of the main shaft 23 of the machine the whole visual indicating device has returned to the initial position shown in FIG. 1 and another indicating cycle may be effected as described above. At the end of the indicating cycle the registering keys 55 have been released by any suitable means (not shown).

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

What we claim is:

1. A visual indicating device for cash registers, comprising indicating cipher rolls mounted in a displaceable carrier, adjusting means for each of the said cipher rolls, a gear transmission between the said cipher rolls and the said adjusting means, spring means for each of the said adjusting means, adapted to displace the said adjusting means from a zero position, a bar adapted for cooperation with all of the said adjusting means for releasing the adjusting means from their zero position, registering keys for each of the said adjusting means, stops on the said keys adapted for cooperation with the said adjusting means when the said keys are operated, a driving shaft, first cam means operable by the said driving shaft adapted for imparting an oscillating movement to the said bar whereby the adjusting means are released from their zero position and are brought by the said spring means into a position determined by the said stops, the adjusting means being subsequently positively reset into their zero position by the return motion of the oscillating movement of the said bar, second cam means operable by the said driving shaft and adapted to displace the said carrier in such a way that the said indicating cipher rolls are disengaged from the said adjusting means before the said adjsuting means are released by the said bar and the cipher rolls being engaged with the adjusting means when the adjusting means are reset into their zero position whereby the cipher rolls are posiitvely brought into their indicating position, a resetting shaft cooperating with the said cipher rolls for resetting them into their zero position and third cam means operable by the said driving shaft adapted for positively controlling the said resetting shaft when the cipher rolls are disengaged from the adjusting means whereby the cipher rolls are positively reset into their zero position.

2. A visual indicating device according to claim 1, the said resetting shaft being mounted in the said displaceable carrier and means being provided for positively connecting the said resetting shaft with the said third cam means for either position of the said carrier in which the cipher rolls are engaged and disengaged respectively from the said adjusting means.

3. A visual indicating device according to claim 2, comprising a driven gear on the said resetting shaft and two fixed driving gears adapted to be positively controlled by the said third cam means, the two fixed gears being so disposed that the said driven gear engages the one or the other of the said driving gears according to whether the said carrier is in the one or other of its positions.

References Cited in the file of this patent

UNITED STATES PATENTS

| | | |
|---|---|---|
| 1,214,886 | Brown | Feb. 6, 1917 |
| 1,230,928 | Rummler | June 26, 1917 |
| 2,088,634 | Breitling et al. | Aug. 3, 1937 |
| 2,119,841 | Breitling | June 7, 1938 |
| 2,289,055 | Landsiedel | July 7, 1942 |